US009319963B2

(12) United States Patent
Lunden et al.

(10) Patent No.: US 9,319,963 B2
(45) Date of Patent: Apr. 19, 2016

(54) HOME BASE STATION MANAGEMENT USING EXTENDED CLOSED SUBSCRIBER GROUP ACCESS

(75) Inventors: Jari Petteri Lunden, Espoo (FI); Elena Virtej, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/375,403

(22) PCT Filed: Feb. 24, 2012

(86) PCT No.: PCT/US2012/026626
§ 371 (c)(1),
(2), (4) Date: Aug. 27, 2014

(87) PCT Pub. No.: WO2013/126079
PCT Pub. Date: Aug. 29, 2013

(65) Prior Publication Data
US 2015/0011218 A1    Jan. 8, 2015

(51) Int. Cl.
*H04W 36/00*  (2009.01)
*H04W 40/16*  (2009.01)
(Continued)

(52) U.S. Cl.
CPC .............. *H04W 40/16* (2013.01); *H04W 36/08* (2013.01); *H04W 48/20* (2013.01); *H04W 36/20* (2013.01); *H04W 48/02* (2013.01); *H04W 76/027* (2013.01); *H04W 84/045* (2013.01)

(58) Field of Classification Search
CPC ..... H04W 40/16; H04W 36/08; H04W 48/20; H04W 48/02; H04W 76/027; H04W 36/20; H04W 84/045
See application file for complete search history.

(56) References Cited

U.S. PATENT DOCUMENTS

2010/0144317 A1    6/2010   Jung et al.
2010/0197310 A1    8/2010   Jung et al.
(Continued)

FOREIGN PATENT DOCUMENTS

WO    2011/027091 A1    3/2011

OTHER PUBLICATIONS

Zou et al., "Support Mobile Idle Handoff From eHRPD to LTE CSG Cells", 3GPP2, Alcatel-Lucent, Jun. 2008, pp. 1-4.
Lindbom et al., "Enhanced Inter-Cell Interference Coordination for Heterogeneous Networks in LTE-Advanced: A Survey", Computer Science, Information Theory, Dec. 7, 2011, pp. 1-18.
(Continued)

*Primary Examiner* — Erin File
(74) *Attorney, Agent, or Firm* — Harrington & Smith (57) ABSTRACT

The application relates to managing interference at the user equipment caused by femtocell base stations, such as home base stations, home E-UTRAN Node B base stations, and the like, configured with closed subscriber groups by allowing the user equipment to access a femtocell base station which would normally not allow access to the user equipment because the user equipment is not a member of the CSG being served by the femtocell base station. When a user equipment is within range of HeNB serving a CSG cell to which the user equipment is allowed access, referred to as the "allowed HeNB", the user equipment may encounter severe interference from another, adjacent HeNB serving another CSG cell, which the user equipment may not be allowed access to, referred to as the "not allowed HeNB", and which may have a stronger signal in terms of power than the HeNB including the CSG to which access is allowed. Rather than to allow the user equipment (114) to access the allowed HeNB (CSG HeNB 1) to which it is a subscriber by virtue of the CSG, the application proposes to instead allow the user equipment (114) to access the adjacent, not allowed HeNB (CSG HeNB 2) serving the other CSG cell, which the user equipment is not allowed to access by virtue of the user equipment not being a member/subscriber of the other CSG.

17 Claims, 8 Drawing Sheets

(51) Int. Cl.
*H04W 48/20* (2009.01)
*H04W 36/08* (2009.01)
*H04W 36/20* (2009.01)
*H04W 84/04* (2009.01)
*H04W 76/02* (2009.01)
*H04W 48/02* (2009.01)

(56) References Cited

U.S. PATENT DOCUMENTS

| | | |
|---|---|---|
| 2010/0272086 A1 | 10/2010 | Jung et al. |
| 2010/0323711 A1 | 12/2010 | Damnjanovic et al. |
| 2011/0039558 A1 | 2/2011 | Lee et al. |
| 2011/0110254 A1 | 5/2011 | Ji et al. |
| 2011/0116480 A1* | 5/2011 | Li et al. ............ 370/332 |
| 2011/0159898 A1* | 6/2011 | Venkatachalam ........ 455/501 |
| 2011/0319084 A1 | 12/2011 | Meshkati et al. |
| 2012/0190365 A1* | 7/2012 | Jeong et al. ............ 455/436 |
| 2012/0322437 A1* | 12/2012 | Fan et al. ............ 455/422.1 |
| 2013/0130679 A1* | 5/2013 | Naka et al. ............ 455/433 |
| 2013/0148523 A1* | 6/2013 | Kim et al. ............ 370/252 |
| 2014/0169238 A1* | 6/2014 | Cai et al. ............ 370/280 |
| 2014/0301254 A1* | 10/2014 | Yamazaki et al. ........ 370/278 |
| 2015/0111578 A1* | 4/2015 | Lee et al. ............ 455/436 |

OTHER PUBLICATIONS

"3rd Generation Partneship Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 10)", 3GPP TS 36.300, v10.5.0, Sep. 2011, pp. 1-194.

"3rd Generation Partnership Project; Technical Specification Group Radio Access Network; Evolved Universal Terrestrial Radio Access (E-UTRA); Radio Resource Control (RRC); Protocol specification(Release 10)", 3GPP TS 36.331, v10.4.0, Dec. 2011, pp. 1-296.

"3rd Generation Partnership Project; Technical Specification Group Radio Access Network; Evolved Universal Terrestrial Radio Access (E-UTRA); Medium Access Control (MAC) Protocol Specification (Release 10)", 3GPP TS 36.321, v10.4.0, Nov. 2011, pp. 1-54.

"Views on PDCCH Interference Mitigation for Het-Nets", 3GPP TSG RAN WG1 #61 bis, R1-103713, Source: Texas Instruments, Agenda Item: 6.8, Jun. 28-Jul. 2, 2010, pp. 1-11.

Song et al., "Mobility Management", Femtocells: Technologies and Deployment, Chapter 7, Nov. 3, 2009, pp. 179-224.

Horn, "3GPP Femtocells: Architecture and Protocols", Qualcomm Incorporated, Sep. 2010, pp. 1-64.

International Search Report and Written Opinion received for corresponding Patent Cooperation Treaty Application No. PCT/US2012/026626, dated Nov. 7, 2012, 14 pages.

* cited by examiner

HOME BASE STATION MANAGEMENT USING EXTENDED CLOSED SUBSCRIBER GROUP ACCESS

RELATED APPLICATION

This application was originally filed as PCT Application No. PCT/US2012/026626 filed on Feb. 24, 2012.

FIELD

The subject matter described herein relates to wireless communications.

BACKGROUND

A femtocell base station is a cellular base station configured for a small coverage area, examples of which include a residence, a small business, or a building. As such, the femtocell base station, such as for example a home base station (HNB) or a home E-UTRAN (evolved Universal Mobile Telecommunications System Terrestrial Radio Access Network) Node B base station (HeNB), may have functionality similar to a typical base station, such as an E-UTRAN Node B (eNB) base station, but the femtocell base station may have less range and power given its limited coverage area. For example, the femtocell base station may have power sufficient for a cell serving wireless devices within a limited range of about tens of meters. Accordingly, wireless service providers view the femtocell base station as a way to extend service coverage indoors into a building, a structure, or a small area where service coverage may be limited, or as a way to offload traffic to the femtocell base station.

SUMMARY

In some exemplary embodiments, there may be provided a method. The method may include sending a request to connect to a home base station including a first closed subscriber group not allowing access to a user equipment, when interference from the home base station inhibits access by the user equipment to another home base station including a second closed subscriber group allowing access to the user equipment; and receiving an indication of a grant of access to the first closed subscriber group.

In some exemplary embodiments, there is also provided a method. The method may include receiving a request to connect to a home base station including a first closed subscriber group not allowing access to a user equipment, when interference from the home base station inhibits access by the user equipment to another home base station including a second closed subscriber group allowing access to the user equipment; performing access control to extend, based on the allowed access to the second closed subscriber group, access of the user equipment to the first closed subscriber group in order to manage the interference; and sending an indication of a grant of access to the first closed subscriber group.

In some exemplary embodiments, one of more variations may be made as well as described in the detailed description below and/or as described in the following features. The request when sent may cause access control to be performed to extend, based on the allowed access to the second closed subscriber group, access of the user equipment to the first closed subscriber group in order to manage the interference. The indication of access to the first closed subscriber group may be received, when the home base station and the another home base station are within range of the user equipment. The indication may include priority information representative of a priority for the user equipment, wherein the priority is lower than another priority assigned to other user equipment of the first closed subscriber group at the home base station. The request may be sent as a radio resource control message including at least one of an identifier of the first home base station and a closed subscriber group identifier of the first home base station. A mobility management entity may perform access control to extend, based on the allowed access to the second closed subscriber group, access of the user equipment to the first closed subscriber group to manage the interference. The user equipment may send the request directly to the home base station to establish access to the first closed subscriber group, when the interference from the home base station inhibits access by the user equipment to the another home base station. The user equipment may send the request to the another home base station to establish access at the home base station to the first closed subscriber group, when the interference from the home base station inhibits access by the user equipment to the another home base station. Another home base station may initiate the user equipment to connect to the home base station by at least sending a handover command to the user equipment, and wherein the another home base station sends the handover command to the user equipment using a muted subframe, when the interference substantially inhibits communication between the user equipment and the another home base station. The home base station may comprise at least one of a femtocell base station, a home base station, and a home evolved universal mobile telecommunications system terrestrial radio access network node B base station.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

DESCRIPTION OF DRAWINGS

In the drawings.

Like labels are used to refer to same or similar items in the drawings.

DETAILED DESCRIPTION

Access restrictions may cause severe interference between adjacent femtocell base stations, such as a home E-UTRAN node B base station (HeNB), serving cells configured with different closed subscriber group (CSG) identifiers. Specifically, when a user equipment is within range of HeNB serving a CSG cell to which the user equipment is allowed access (referred to herein as the "allowed HeNB" and/or the "allowed CSG"), the user equipment may encounter severe interference from another, adjacent HeNB serving another CSG cell, which the user equipment may not be allowed access to (referred to herein as the "not allowed HeNB," "non-allowed HeNB," and/or "not allowed CSG") and which may have a stronger signal (in terms of power) than the HeNB including the CSG to which access is allowed. Indeed, the interference from the adjacent, not allowed HeNB might be so severe that the user equipment may not be able to establish a connection to the allowed HeNB to which it is allowed access by virtue of its membership in the CSG at the HeNB. Rather than allow the user equipment to access the allowed HeNB to which it is a subscriber by virtue of the CSG, the subject matter described herein may, in some exemplary embodiments, be configured to instead allow the user equipment (and/or user(s) thereof) to access the adjacent, not allowed HeNB serving the other CSG cell, which the user equipment is not allowed to access by virtue of the user equipment not being a member/subscriber of the other CSG. The user equipment may be allowed access the so-called "not allowed" HeNB in order to manage the interference encountered by the user equipment. In some exemplary embodiments, the subject matter described herein may thus relate to managing interference at the user equipment caused by femtocell base stations, such as home base stations, home E-UTRAN Node B base stations, and the like, configured with closed subscriber groups by allowing the user equipment to access a femtocell base station which would normally not allow access to the user equipment because the user equipment is not a member of the CSG being served by the femtocell base station.

Figure 1:
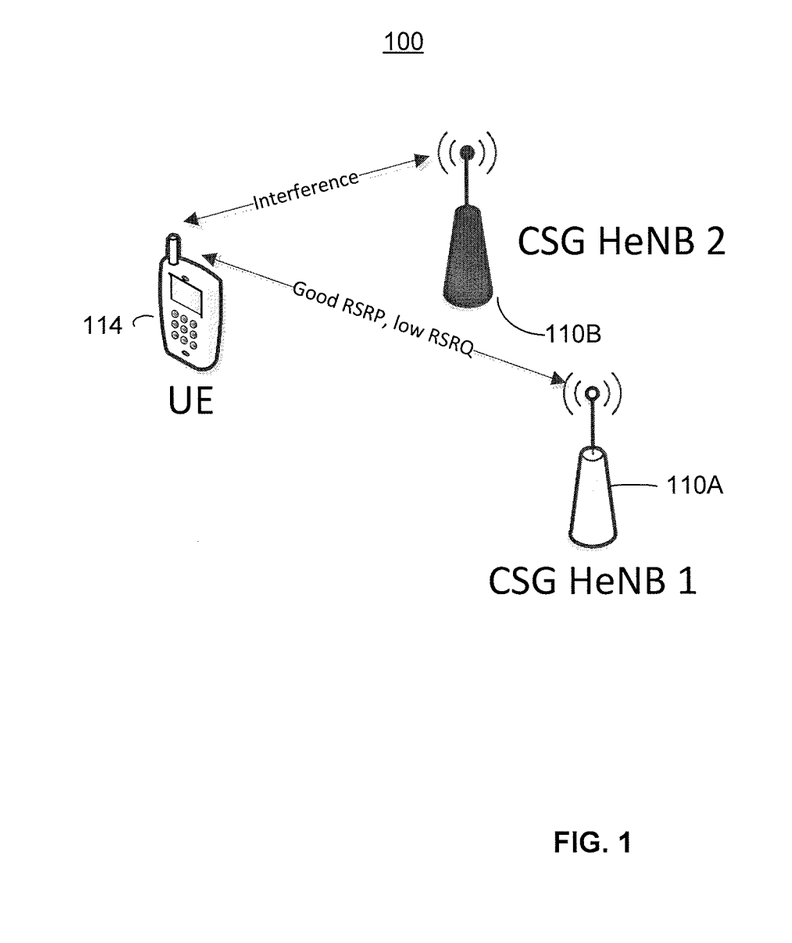
FIG. 1 depicts an example of a system configured to allow a user equipment to access a femtocell base station, such as a home E-UTRAN node B base station (HeNB) that has access restricted to members of a closed subscriber group even though the closed subscriber group does not include the user equipment, in accordance with some exemplary embodiments.

FIG. 1 depicts an example of a system 100 including a user equipment 114, a first femtocell base station 110A, and a second femtocell base station 110B. In some exemplary embodiments, the femtocell base stations 110A-B may be configured as a home E-UTRAN node B base station (HeNB) configured in accordance with standards, such as for example Third Generation Partnership Project (3GPP) Long Term Evolution (LTE), although other standards and technologies may be used as well.

The first femtocell base station 110A may be configured with a CSG identifier which allows access to user equipment 114 (or the users thereof), but the second femtocell base station 110B may not include a CSG identifier that allows access to user equipment 114. In this example, the first and second femtocell base stations 110A-B may be adjacent, such that femtocell base station 110B causes interference at user equipment 114, when user equipment 114 communicates with femtocell base station 110A. Specifically, the first femtocell base station 110A may provide a cell (e.g., coverage area) at which the CSG including user equipment 114 may access the first femtocell base station 110A. Moreover, user equipment 114 may measure that the first femtocell base station 110A has reasonably good reference signal received power (RSRP) but a low reference signal received quality (RSRQ) due to severe interference caused by a strong interference signal from the second femtocell base station 110B, which does not allow access to user equipment 114. In the example of FIG. 1, the radio frequency signals from second femtocell base station 110B may be stronger than the radio frequency signals from the first femtocell base station 110A, and, as such, if the user equipment 114 were able to couple to the first femtocell base station 110A, the stronger radio frequency signals from the second femtocell base station 110B would cause severe interference at user equipment 114, and such interference may manifest itself in the form of a relatively low RSRQ.

In some exemplary embodiments, the user equipment 114 is temporarily allowed access to the second femtocell base station 110B, when access to an adjacent allowed femtocell base station 110A would result in interference (which may be caused by the second femtocell base station 110B) at user equipment 114, or the access to allowed femtocell base station 110A would result in interference at second femtocell base station 110B. Moreover, the user equipment 114 may, in some exemplary embodiments, be allowed access to the second femtocell base station 110B with a lower priority than other user equipment (or user(s) thereof) that are members of the CSG of the second femtocell base station 114B.

Although FIG. 1 depicts two femtocell base stations, such as home base stations 110A-B, and a single user equipment 114, the wireless communication system 100 may include other quantities of home base stations and user equipment as well.

The user equipment 114 may be configured to access a femtocell base station, such as a HeNB, although user equipment 114 may also access other base stations and radio network access points as well.

Although some of the examples herein refer to the femtocell base stations as home E-UTRAN node B base stations in accordance with the LTE series of standards, the femtocell base stations (as well as other devices in system 100) may be implemented in accordance with other standards and technologies as well. Moreover, although FIG. 1 depicts an example of a configuration for the femtocell base stations, the femtocell base stations, such as home base stations 110A-B, may be configured in other ways. For example, HeNBs 110A-B may have wired and/or wireless backhaul links to other network nodes, such as a mobility management entity, other base stations, a radio network controller, a core network, a serving gateway, and the like.

In some exemplary embodiments, the HeNB may communicate to the user equipment via uplinks and downlinks. For example, the uplink may comprise a radio frequency (RF) signal carrying information, such as control messages, data, and the like, from the user equipment to the HeNB, and a downlink may comprise a radio frequency signal carrying information from the HeNB to the user equipment. For example, when LTE is used, the RF signal may use OFDMA. OFDMA is a multi-user version of orthogonal frequency division multiplexing (OFDM). In OFDMA, multiple access is achieved by assigning, to individual users, groups of subcarriers (also referred to as subchannels or tones). The subcarriers are modulated using BPSK (binary phase shift keying), QPSK (quadrature phase shift keying), or QAM (quadrature amplitude modulation), and carry symbols (also referred to as OFDMA symbols) including data coded using a forward error-correction code. The subject matter described herein is not limited to application to OFDMA systems, LTE, LTE-Advanced, or to the noted standards and specifications.

In some exemplary embodiments, the user equipment 114 may be implemented as a mobile device and/or a stationary device. The user equipment 114 may be referred to as, for example, mobile stations, mobile units, subscriber stations, wireless terminals, tablets, smart phones, smart devices, wireless devices, or the like. A user equipment may be implemented as, for example, a wireless handheld device, a wireless plug-in accessory, or the like. In some cases, user equipment may include a processor, a computer-readable storage medium (e.g., memory, storage, and the like), a radio access mechanism, and/or a user interface.

Figure 2:
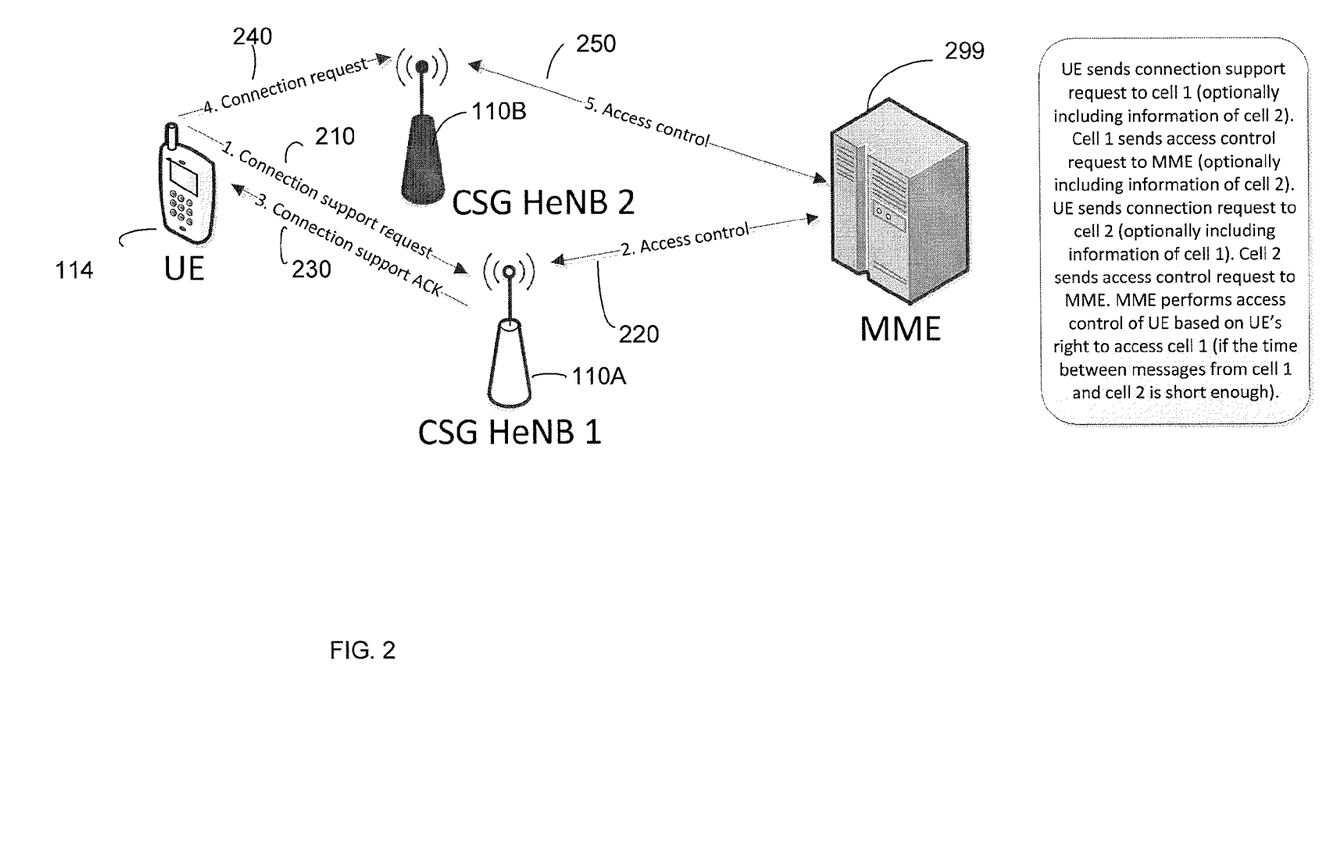
FIG. 2 depicts another example of a system configured to allow a user equipment to access a femtocell base station that has access restricted to members of a closed subscriber group even though the closed subscriber group does not include the user equipment, in accordance with some exemplary embodiments.

FIG. 2 depicts a system 200 configured to manage interference, in accordance with some exemplary embodiments. The system 200 is similar to system 100 but further includes a network node, such as a mobility management entity 299, and depicts a process 210-250 for allowing user equipment 114 to access the second femtocell base station 110B (which does not list user equipment 114 as a member/subscriber of the CSG), when access to the adjacent, allowed femtocell base station 110A is inhibited by interference caused by the second femtocell base station 110B.

The user equipment 114 may measure and/or identify that it is within range of a femtocell base station, such as HeNB 110A, with a CSG allowing access to user equipment 114, but the measurements may indicate that severe interference is present, and the source of the interference is HeNB 110B configured with a CSG that does not allow access to user equipment 114. For example, user equipment 114 may measure that the RSRP is sufficient (e.g., higher or equal to a predefined threshold) to couple to HeNB 110A but user equipment 114 may also measure that HeNB 110B has higher RSRP (e.g., the RSRP of HeNB 110B is about larger than RSRP of HeNB 110A and/or a threshold value), causing severe interference and a degradation in the RSRQ from HeNB 110A.

At 210, user equipment 114 may, in some exemplary embodiments, send a message to HeNB 110A, and the message may include an indication that user equipment 114 needs connection support in order to access and thus establish a connection to HeNB 110B. In some exemplary embodiments, the message may be configured as a random access message (or, e.g., as a radio resource control (RRC) message transmitted during the random access procedure) including the E-UTRAN cell global identifier (E-CGI) of HeNB 110B and the CSG identifier of HeNB 110B.

In response to receiving the message sent at 210, HeNB 110A may, in some exemplary embodiments, configure the use of muted subframes (also referred to as almost blank subframes) for communicating with the user equipment 114 in the downlink until user equipment 114 gains access to HeNB 110B.

At 220, a node in the network, such as for example mobility management entity 299, may allow, in some exemplary embodiments, user equipment 114 to access HeNB 110B despite user equipment 114 not being a part of the CSG at HeNB 110B. To allow access, HeNB 110A and mobility management entity 299 may perform access control of user equipment 114 to first determine whether user equipment 114 should be granted access to the CSG at HeNB 110A, and then extend that access to the CSG at the non-allowed HeNB 110B. In some exemplary embodiments, access control may be configured to allow user equipment 114 to access the CSG at HeNB 110A for a certain duration (e.g., 24 hours), so that the extended access given to user equipment 114 can be given without requiring access control via HeNB 110A each time extended access is need at HeNB 110B. User equipment 114 may, in some exemplary embodiments, perform an initial access control processes (e.g., cell selection or handover) to HeNB 110B sooner, rather than later in order to verify that HeNB 110A and HeNB 110B are adjacent to, or within range of, user equipment 114.

At 230, HeNB 110A may send an acknowledgement message to user equipment 114 indicating that user equipment 114 may connect to HeNB 110B, in accordance with some exemplary embodiments. HeNB 110A may also send a handover command to user equipment 114 to directly initiate handover to HeNB 110B. Furthermore, HeNB 110A may configure user equipment 114 to add (e.g., temporarily add) to its list of CSG identifiers, a CSG identifier that allows user equipment 114 to access HeNB 110B. At 240, user equipment 114 may request a connection by performing a random access control process with HeNB 110B, in accordance with some exemplary embodiments. In addition, at 250, HeNB 110B and the network, such as mobility management entity 299, may, in some exemplary embodiments, perform access control for user equipment 114 to determine whether to grant user equipment 114 access to HeNB 110B. For example, mobility management entity 299 may send a message to HeNB 110B to allow access to user equipment 114 even though user equipment 114 is not a member of the CSG at HeNB 110B. As another example, mobility management entity 299 may send a message to HeNB 110B configuring it to allow access to any user equipment that is a member of the CSG that user equipment 114 is a member of. Furthermore, the message to HeNB 110B may include a duration for the access. When access is granted at HeNB 110B, user equipment 114 can establish a connection to HeNB 110B despite user equipment 114 not being a member of the CSG at HeNB 110B in order to manage the above-noted interference caused by HeNB 110B.

The HeNB 110B may, as noted, interfere with user equipment 114 so severely that it inhibits user equipment 114 from establishing a connection to HeNB 110A. For this reason, user equipment 114 may indicate the existence of such interference during the random access to HeNB 110A (e.g., during the initial request at 210), so that muted subframes (or some other interference protected resources) may be used on the downlink from HeNB 110A to user equipment 114.

In some exemplary embodiments, user equipment 114 may establish a connection to HeNB 110A as a random access performed in accordance with TS 36.321, and, as such, a radio resource control message (e.g., RRCConnectionRequest message) may be used. For example, user equipment 114 may send, at 210, the RRCConnectionRequest message including an enumerated value field to request muted subframes from HeNB 110A, although other types of messages may be used as well. Table 1 below depicts an example of a radio resource control connection request message including an indication of a "muted subframe" to allow the HeNB 110A to implement muted subframes on the downlink to user equipment 114. Alternatively, the RRCConnectionRequest or another type of RRC message (which may be generated or defined expressly for the muted subframe request) may indicate the purpose of the connection is to access a not-allowed CSG (e.g., "csgConnectionSupport"). Additionally, information representative of the target cell may be included in the signaling message, for example the E-CGI of HeNB 110B and/or the CSG identifier of HeNB 110B.

TABLE 1

EstablishmentCause ::= ENUMERATED {
emergency, highPriorityAccess,
mt-Access, mo-Signalling,
mo-Data, delayTolerantAccess-v10x0,
muted subframe, spare1}

Figure 3:
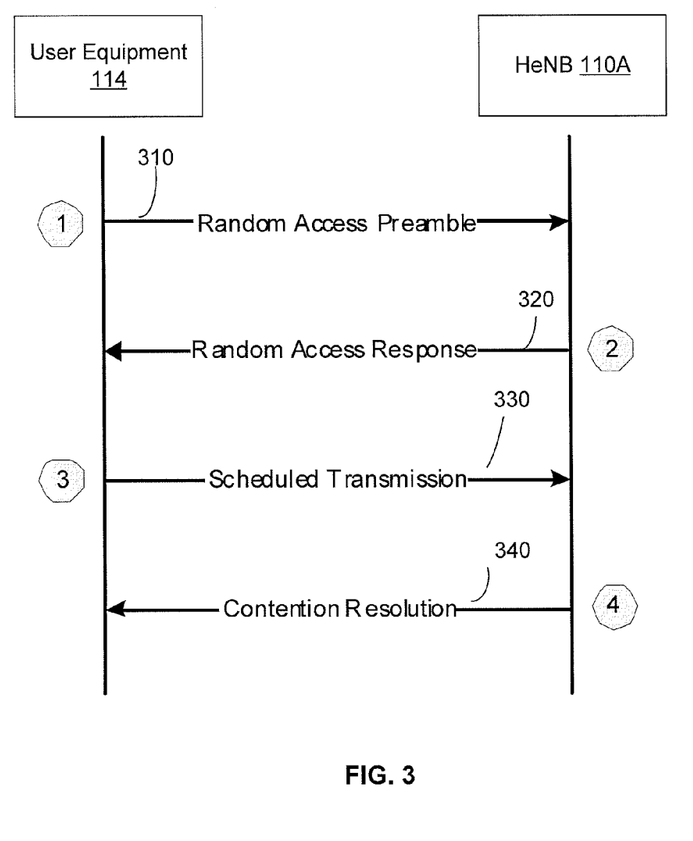
FIG. 3 depicts a random access process between a user equipment and a femtocell base station, in accordance with some exemplary embodiments.

FIG. 3 depicts random access control between the user equipment 114 and HeNB 110A. At 310, user equipment 114 may gain access to HeNB 110A by first sending a random access preamble message at 310. At 320, HeNB 110A responds with a random access response (RAR) message, after which user equipment 114 transmits to HeNB 110A at scheduled times as shown at 330, and any conflicts may be resolved, at 340, by the HeNB 110A.

The interference caused by HeNB 110B may cause user equipment 114 to have difficulty receiving even the random access response (RAR) sent at 320, when the random access response message is not transmitted by the HeNB 110A on the downlink using an interference protected mechanism, such as muted subframe (or almost blanked subframe). To address this interference, the HeNB 110A may schedule the user equipment's transmission again by transmitting the random access response in the muted subframe of the downlink, when the user equipment 114 does not respond to the random access response (e.g., when due to interference, user equipment 114 was unable to receive the random access response after one or more attempts). Alternatively, or in addition to, the user equipment 114 may also indicate in the random access preamble message 310 that it needs to use an interference protected mechanism, such as muted subframes. For example, the preamble of the random access preamble message 310 may indicate that a muted subframe is requested, although other portions of random access preamble message 310 may be used as well. This may be as well implemented as a specific random access preamble configured for this purpose of requesting muted subframes (or other interference protected mechanism). For example, random access preambles may be configured (or reserved) for indicating the need for interference protected resources, such as muted subframes. These configured/reserved preambles may be fixed or indicated by the network in the system information broadcast. In any case, user equipment 114 may send to HeNB 110A (e.g., at 210) a radio resource control message indicating a request to connect to the non-allowed CSG cell at HeNB 110B, and the message may also confirm that further downlink communication from the HeNB 110A to user equipment 114 may need to temporarily use muted subframes.

Figure 4:
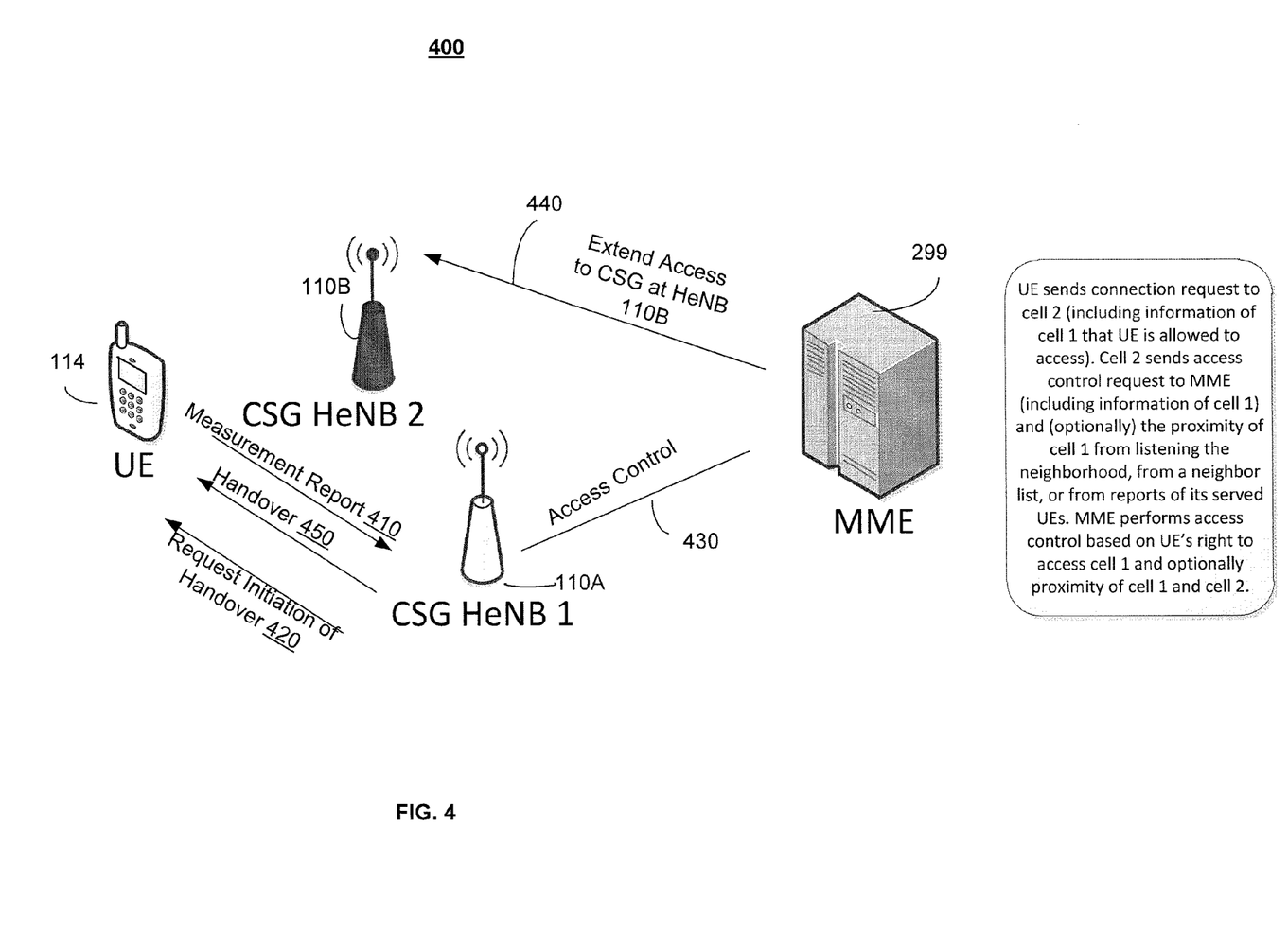
FIGS. 4-5 depict other examples of systems configured to allow a user equipment to access a femtocell base station that has access restricted to members of a closed subscriber group even though the closed subscriber group does not include the user equipment, in accordance with some exemplary embodiments.

FIG. 4 depicts a system 400 configured to manage interference, in accordance with some exemplary embodiments. In the example of FIG. 4, the initiation of a change in cell from the allowed CSG at HeNB 110A to the CSG at HeNB 110B (which does not allow access to user equipment 114) is initiated by HeNB 110A, rather than the user equipment 114 as described above with respect to FIG. 2.

User equipment 114 may measure and/or identify that it is within range of HeNB 110A serving a CSG which allows access to user equipment 114, but the measurement, such as RSRQ, may indicate that reception from HeNB 110A is severely interfered by another HeNB 110B serving a CSG which does not allow access to user equipment 114. When this is the case, user equipment 114 may send, at 410, a measurement report to HeNB 110A, in accordance with some exemplary embodiments. This measurement report may include RSRP, RSRQ, and other measurements made with respect to HeNB 110B, which is causing interference at user equipment 114.

At 420, HeNB 110A may initiate a handover of user equipment 114 from HeNB 110A to HeNB 110B, in accordance with some exemplary embodiments. HeNB 110A and mobility management entity 299 may, at 430, perform access control for user equipment 114 to access HeNB 110A and, based on that access, extend access to HeNB 110B, even though user equipment 114 is not a subscriber/member of the CSG of HeNB 110B (and thus otherwise not allowed access to HeNB 110B). Although FIG. 4 depicts the network initiating a handover, the user equipment may initiate a handover as well. For example, the handover may be initiated by the user equipment as described below, but if it is initiated by the network/base station 110B, then it would be in response to receiving the measurement report at 410.

At 440, HeNB 110B and mobility management entity 299 may extend access to user equipment 114, even though user equipment 114 is not a subscriber/member of the CSG of HeNB 110B, in order to manage the interference at user equipment 114. At 450, HeNB 110A sends a handover command instructing user equipment to hand over to the CSG at HeNB 110B.

In some exemplary embodiments of FIG. 4, one or more user equipment of a CSG at HeNB 110A which are within range of HeNB 110A may be allowed access to the CSG at HeNB 110B, even though the one or more user equipment are not subscribers/members of the CSG at HeNB 110B.

In some exemplary embodiments, a radio resource control message, such as a RRCConnectionRequest message configured with an establishment cause ("EstablismentCause"), may be used in the random access from user equipment 114 to HeNB 110A (e.g., at 420) to initiate a handover to the non-allowed CSG at HeNB 110B (e.g., the spare field may be used to indicate the handover to the non-allowed CSG at HeNB 110B), although other types of messages may be used as well. Table 2 depicts an example of an EstablismentCause information element including an identifier, such as the "csgConnectionSupport," indicating that the user equipment 114 is connecting to HeNB 110A for the purpose of getting access to another CSG at a HeNB. The measurement report from user equipment to HeNB 110A may identify the target of the handover, which is the non-allowed HeNB 110B. Instead of RRCConnectionRequest message, another type of message (which may be generated and/or defined expressly for signaling the purpose of the connection, which is to access the non-allowed CSG) may be sent separately from the RRCConnectionRequest message and may include information such as E-CGI of HeNB 110B and/or CSG identifier of HeNB 110B.

TABLE 2

EstablishmentCause ::= ENUMERATED
{
emergency,
highPriorityAccess, mt-Access, mo-Signalling,
mo-Data,
delayTolerantAccess-v10x0,
csgConnectionSupport,
spare1}

Figure 5:
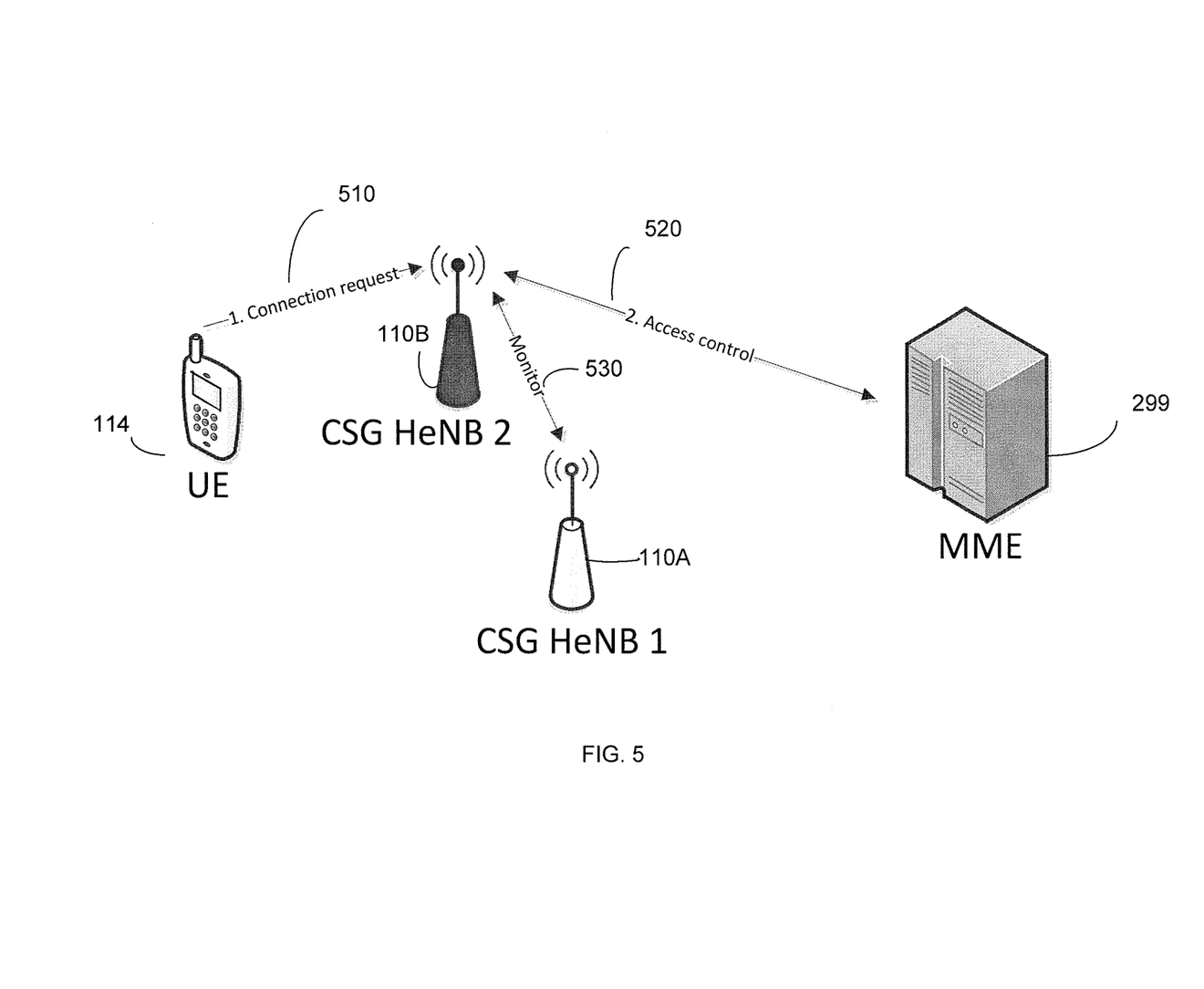

FIG. 5 depicts a system 500 configured to manage interference, in accordance with some exemplary embodiments. In the example of FIG. 5, user equipment 114 initiates the establishment of a direct connection to the non-allowed CSG at HeNB 110B, rather than request the connection from HeNB 110A or be directed to do so by the network.

User equipment 114 may measure and/or indentify that user equipment 114 is within range of an allowed CSG at HeNB 110A, but the measurement may indicate severe interference at user equipment 114 caused by HeNB 110B serving a non-allowed CSG.

At 510, user equipment 114 may perform a random access directly to HeNB 110B, in accordance with some exemplary embodiments. For example, user equipment 114 may send a random access message (or a radio resource control message sent during the random access) via an uplink to HeNB 110B. When a random access message is sent by user equipment 114 via the uplink to HeNB 110B, the random access message may include the E-CGI of the allowed CSG at HeNB 110A and the CSG identifier of the allowed CSG at HeNB 110A.

At 520, a node in the network, such as mobility management entity 299, may, in some exemplary embodiments, perform access control to allow user equipment 114 to access HeNB 110B, and the access is granted based on the user equipment's right to access the allowed CSG at HeNB 110A. For example, HeNB 110A may provide to HeNB 110B information indicating that user equipment 114 is allowed access to the CSG at HeNB 110A. Thus, when access control is performed at 520, mobility management entity 299 may enable user equipment 114 to access the CSG at HeNB 110B, effectively extending user equipment 114's access rights from the CSG at HeNB 110A to the CSG at HeNB 110B. In some exemplary embodiments, a node in the network, such as mobility management entity 299, may also check, at 520, that the cells served by HeNB 110A and HeNB 110B are near each other (e.g., within radio range of each other, or generally in the same geographic area). Furthermore, HeNB 110B may verify, as part of 520, that HeNB 110A is nearby (e.g., based on a list of neighboring HeNB, a scan for other cells/HeNBs, information reported by user equipment 114, or a combination thereof).

If there is a direct signalling connection between cell HeNB 110A and HeNB 110B (e.g., over-the-air or X2 interface), then the verification of proximity between HeNB 110A-B and user equipment 114 may be performed over this direct signaling connection. Moreover, access control support request information (e.g., the CSG information for the allowed CSG or information regarding access rights or CSG membership of user equipment 114) may be transmitted via the direct signaling connection as well.

In some exemplary embodiments, a radio resource control message, such as a RRCConnectionRequest message configured with an establishment cause ("EstablismentCause"), may be used in the random access from user equipment 114 to HeNB 110B (e.g., at 510). The EstablismentCause may include information indicating that the connection is requested to a not allowed CSG HeNB (e.g., the spare may be used to indicate "csgInterferenceManagement" cause), although other types of messages may be used as well. Table 3 depicts an example of an EstablismentCause message (or information element)

TABLE 3

| |
| --- |
| EstablishmentCause ::= ENUMERATED { |
| emergency, |
| highPriorityAccess, |
| mt-Access, mo- |
| Signalling, |
| mo-Data, |

TABLE 3-continued

| |
| --- |
| delayTolerantAccess-v10x0, |
| csgInterference-Management, spare1} |

At 530, HeNB 110B may monitor its neighborhood and detect the presence of HeNB 110A. Moreover, an acknowledgement message may be sent from HeNB 110B to the user equipment 114 (and/or HeNB 110A) to confirm that user equipment has connected to HeNB 110B, although this connection may be signaled directly between the HeNBs 110A-B (e.g., via an X2 signaling connection). Furthermore, a message may be generated and/or sent to acknowledge that access is granted (e.g., as a result of the random access procedure, an RRC connection is established and user equipment 114 is served by the HeNB 110B and the CSG therein).

Figure 6:
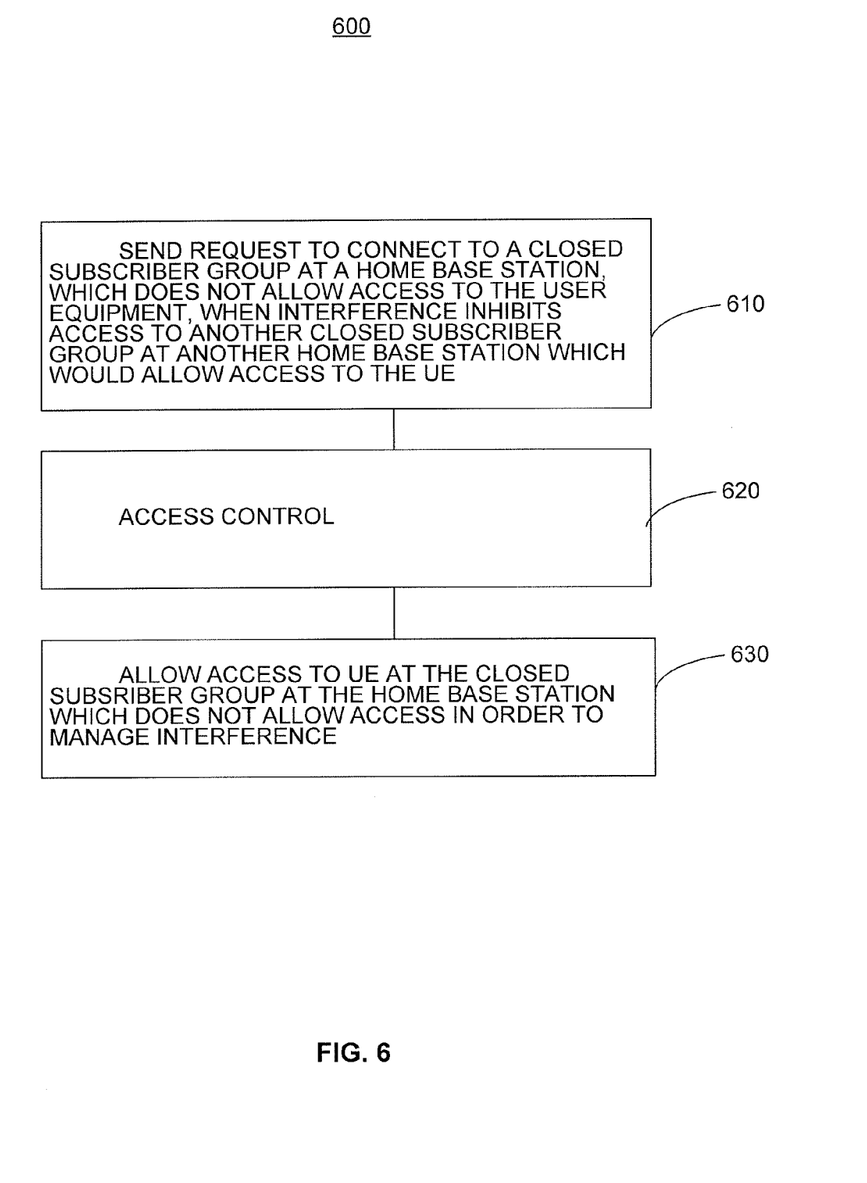
FIG. 6 depicts a process for allowing a user equipment to access a femtocell base station that has access restricted to members of a closed subscriber group even though the closed subscriber group does not include the user equipment, in accordance with some exemplary embodiments.

FIG. 6 depicts a process 600 for allowing a user equipment to access a CSG at a femtocell base station, even though the user equipment 114 is not a subscriber/member of the CSG, in order to manage interference in accordance with some exemplary embodiments. The description of process 600 also refers to FIGS. 1, 2, 4, and 5.

At 610, a request may be sent to connect to a closed subscriber group at a femtocell base station, which does not allow access to a user equipment, when interference inhibits access by the user equipment to another femtocell base station including a closed subscriber group that would otherwise allow access to the user equipment. Moreover, the access may be extended, as noted, to the non-allowed CSG at the femtocell base station, such as HeNB 110B, in order to manage the interference. In some exemplary embodiments, the user equipment 114 may send a connection request directly to the non-allowed femtocell base station, such as HeNB 110B, as described above with respect to FIG. 5. In some exemplary embodiments, the user equipment 114 may send a connection request to the other femtocell base station, such as allowed HeNB 110A, to initiate the access control and connection establishment to the non-allowed femtocell base station, such as HeNB 110B, as described above with respect to FIG. 2. In some exemplary embodiments, the allowed femtocell base station, such as HeNB 110A, initiates user equipment 114's access to the non-allowed femtocell base station, such as HeNB 110B, as described above with respect to FIG. 4.

At 620, access control may be performed to allow user equipment 114 to access the non-allowed femtocell base station, such as HeNB 110B, despite the fact that user equipment 114 is not a member/subscriber of the CSG at HeNB 110B. For example, the network, or a node therein such as mobility management entity 299, may extend the access of user equipment 114 at the CSG at the allowed HeNB 110A to the non-allowed CSG at HeNB 110B. In some exemplary embodiments, HeNB 110A may provide to the network, or a node therein such as mobility management entity 299, information, such as the CSG identifiers of one or more user equipment being served by the CSG at HeNB 110A, so that the network or mobility management entity can perform access control, extending thus access to the non-allowed CSG at HeNB 110B.

At 630, access may, in some exemplary embodiments, be granted to the user equipment 114 at the closed subscriber group at the femtocell base station, such as the CSG at HeNB 110B which does not allow access in order to manage interference. In some exemplary embodiments, the access may be granted by way of a handover, as described with respect to FIG. 4. In some exemplary embodiments, the access may be granted by granting access via a random access to the non-allowed CSG at the HeNB 110B, which has been instructed by the network, or a node therein such as the mobility management entity 299, to allow user equipment 114 access.

Figure 7:
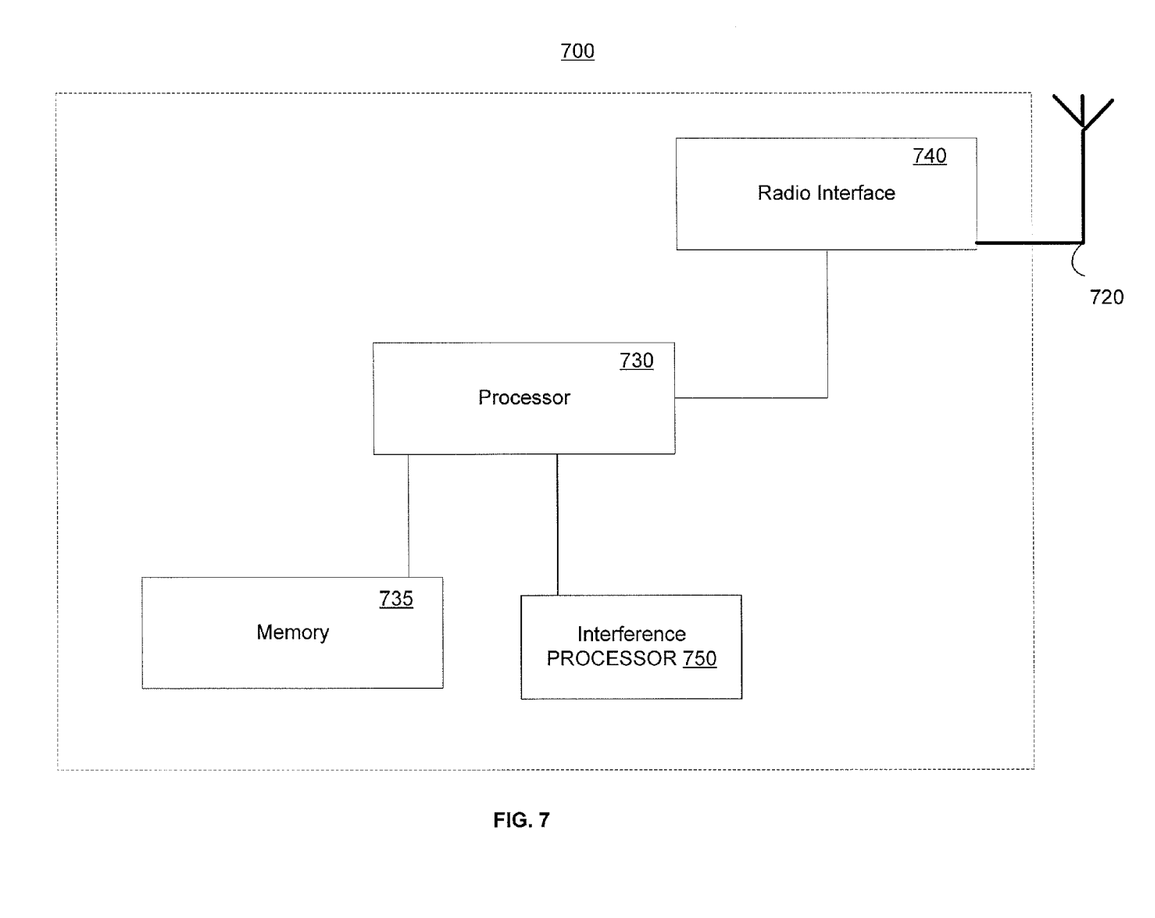
FIG. 7 depicts an example of a femtocell base station, in accordance with some exemplary embodiments.

FIG. 7 depicts an example implementation of a base station 700, which may be implemented at home base station 110A-B. The base station may include one or more antennas 720 configured to transmit via a downlink and configured to receive uplinks via the antenna(s) 720. The home base station may further include a radio interface 740 coupled to the antenna 720, a processor 730 for controlling the home base station 700 and for accessing and executing program code stored in memory 735. The radio interface 740 may further include other components, such as filters, converters (e.g., digital-to-analog converters and the like), mappers, a Fast Fourier Transform (FFT) module, and the like, to generate symbols for a transmission via one or more downlinks and to receive symbols (e.g., via an uplink). In some implementations, the base station may also be compatible with IEEE 802.16, LTE, LTE-Advanced, and the like, and the RF signals of downlinks and uplinks are configured as an OFDMA signal. The home base station may include an interference processor 750. In some implementations, the interference processor 750 may perform one or more of the operations described herein with respect to a home base station, such as a HeNB.

Figure 8:
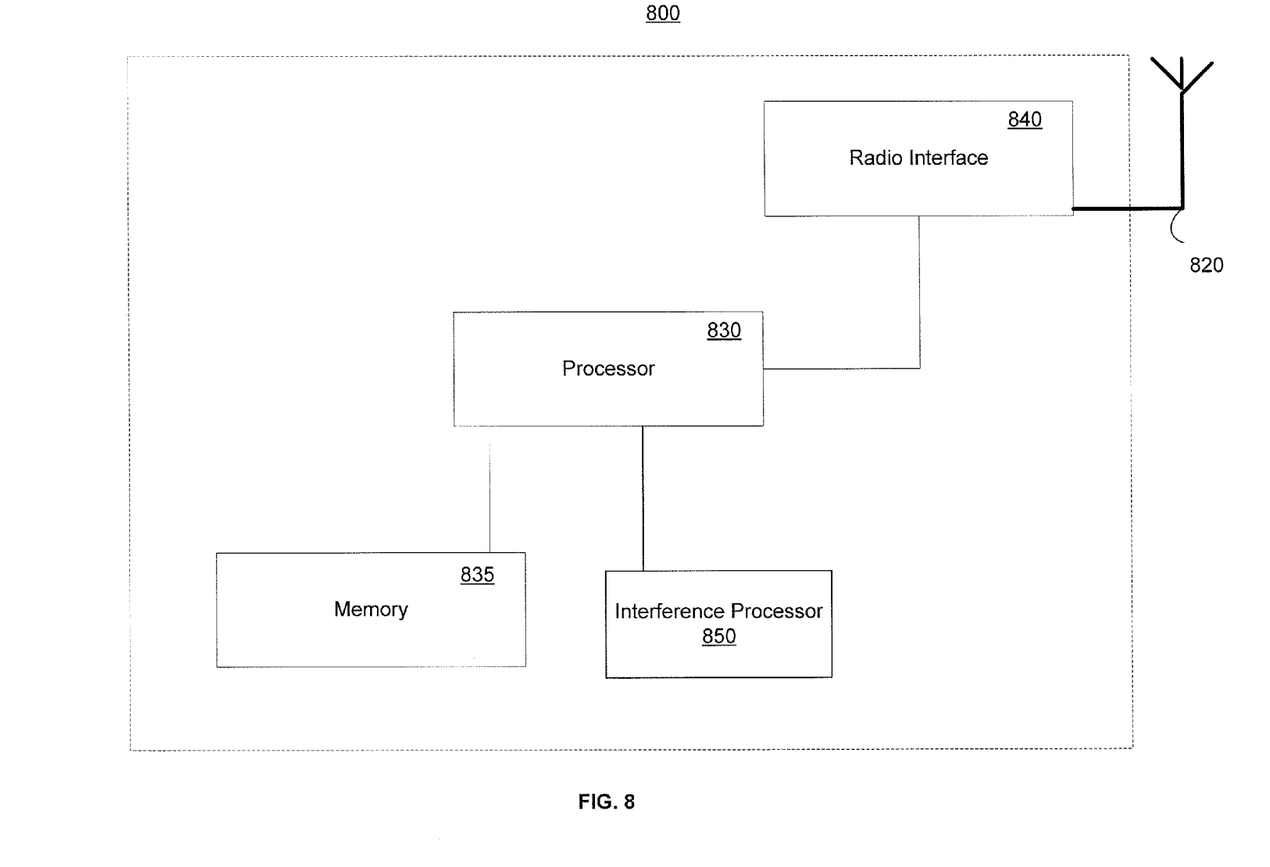
FIG. 8 depicts an example of user equipment, in accordance with some exemplary embodiments.

FIG. 8 depicts a block diagram of a radio, such as a user equipment 800. The user equipment 800 may include an antenna 820 for receiving a downlink and transmitting via an uplink. The user equipment 800 may also include a radio interface 840, which may include other components, such as filters, converters (e.g., digital-to-analog converters and the like), symbol demappers, signal shaping components, an Inverse Fast Fourier Transform (IFFT) module, and the like, to process symbols, such as OFDMA symbols, carried by a downlink or an uplink. In some implementations, the user equipment 800 may also be compatible with WiFi, Bluetooth, GERAN, UTRAN, E-UTRAN, and/or other standards and specifications as well. The user equipment 800 may further include at least one processor, such as processor 830, for controlling user equipment 800 and for accessing and executing program code stored in memory 835. The user equipment may include an interference processor 850. In some exemplary embodiments, the interference processor 850 may perform one or more of the operations described herein with respect to user equipment.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "machine-readable medium" refers to any computer program product, computer-readable medium, computer-readable storage medium, apparatus and/or device (e.g., magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. For example, the implementations described above may be directed to various combinations and subcombinations of the disclosed features and/or combinations and subcombinations of several further features disclosed above. In addition, the logic flow depicted in the accompanying figures and/or described herein does not require the particular order shown, or sequential order, to achieve desirable results. Other embodiments may be within the scope of the following claims.

What is claimed is:

1. A method comprising:
 sending a request to connect to a home base station of a first closed subscriber group not allowing access to a user equipment, when interference from the home base station inhibits access by the user equipment to another home base station of a second closed subscriber group allowing access to the user equipment; and
 receiving an indication of a grant of access to the first closed subscriber group when the home base station and the another home base station are within range of the user equipment;
 wherein sending the request is configured to cause access control to be performed to extend, based on the allowed access to the second closed subscriber group, access of the user equipment to the first closed subscriber group.

2. A method as in claim 1, wherein the access control extending the access of the user equipment to the first closed subscriber group is performed in order to manage the interference.

3. A method as in claim 1, wherein the indication includes priority information representative of a priority for the user equipment, wherein the priority is lower than another priority assigned to other user equipment of the first closed subscriber group at the home base station.

4. A method as in claim 1, wherein the sending further comprises:
 sending the request as a radio resource control message including at least one of an identifier of the home base station and a closed subscriber group identifier of the home base station.

5. A method as in claim 1, wherein the user equipment sends the request directly to the home base station to establish access to the first closed subscriber group, when the interference from the home base station inhibits access by the user equipment to the another home base station.

6. A method as in claim 1, wherein the user equipment sends the request to the another home base station to establish access at the home base station to the first closed subscriber group, when the interference from the home base station inhibits access by the user equipment to the another home base station.

7. A method as in claim 1, wherein the user equipment is initiated by the other home base station to connect to the home base station by at least receiving a handover command from the other home base station, and wherein the handover command is received in a muted subframe, when the interference substantially inhibits communication between the user equipment and the another home base station.

8. An apparatus comprising:
  at least one processor; and
  at least one non-transitory memory including code,
  the at least one non-transitory memory and the code configured to, with the at least one processor, cause the apparatus to at least:
    send a request to connect to a home base station of a first closed subscriber group not allowing access to the apparatus, when interference from the home base station inhibits access by the apparatus to another home base station of a second closed subscriber group allowing access to the apparatus; and
    receive an indication of a grant of access to the first closed subscriber group when the home base station and the another home base station are within range of the user equipment;
    wherein sending the request is configured to cause access control to be performed to extend, based on the allowed access to the second closed subscriber group, access of the user equipment to the first closed subscriber group.

9. An apparatus as in claim 8, wherein the access control extending the access of the apparatus to the first closed subscriber group is performed in order to manage the interference.

10. An apparatus as in claim 8, wherein the indication includes priority information representative of a priority, the priority being lower than another priority assigned to other user equipment of the first closed subscriber group at the home base station.

11. An apparatus as in claim 8, wherein the sending further comprises:
  sending the request as a radio resource control message including at least one of an identifier of the home base station and a closed subscriber group identifier of the home base station.

12. An apparatus as in claim 8, wherein the apparatus sends the request directly to the home base station to establish access to the first closed subscriber group, when the interference from the home base station inhibits access by the apparatus to the another home base station.

13. An apparatus as in claim 8, wherein the apparatus sends the request to the another home base station to establish access at the home base station to the first closed subscriber group, when the interference from the home base station inhibits access by the apparatus to the another home base station.

14. An apparatus as in claim 8, wherein the apparatus is initiated by the other home base station to connect to the home base station by at least receiving a handover command from the other home base station, and wherein the handover command is received in a muted subframe, when the interference substantially inhibits communication between the apparatus and the another home base station.

15. An apparatus comprising:
  at least one processor; and
  at least one non-transitory memory including code, the at least one non-transitory memory and the code configured to, with the at least one processor, cause the apparatus to at least:
    receive a request from a user equipment to connect to the apparatus of a first closed subscriber group not allowing access to the user equipment, when interference from the apparatus inhibits access by the user equipment to another home base station of a second closed subscriber group allowing access to the user equipment;
    perform access control to extend, based on the allowed access to the second closed subscriber group, access of the user equipment to the first closed subscriber group in order to manage the interference; and
    send an indication of a grant of access to the first closed subscriber group when the another home base station is within range of the user equipment.

16. The apparatus of claim 15, wherein the apparatus comprises at least one of a femtocell base station, a home base station, and a home evolved universal mobile telecommunications system terrestrial radio access network node B base station.

17. The apparatus of claim 15, wherein performing the access control to extend, based on the allowed access to the second closed subscriber group, the access of the user equipment to the first closed subscriber group is performed by a mobility management entity.

* * * * *